United States Patent
Lunde et al.

[11] Patent Number: 6,026,056
[45] Date of Patent: Feb. 15, 2000

[54] METHOD AND APPARATUS FOR REDUCING THE EFFECT OF ROUGH SEA SURFACE CONDITIONS ON MARINE SEISMIC SOURCES

[75] Inventors: Nils Lunde, Haslum, Norway; Leon John Walker, Oxted, United Kingdom

[73] Assignee: Geco A.S., Asker, Norway

[21] Appl. No.: 09/101,815

[22] PCT Filed: Jan. 15, 1997

[86] PCT No.: PCT/GB97/00094

§ 371 Date: Jul. 17, 1998

§ 102(e) Date: Jul. 17, 1998

[87] PCT Pub. No.: WO97/26558

PCT Pub. Date: Jul. 24, 1997

[30] Foreign Application Priority Data

Jan. 17, 1996 [GB] United Kingdom .................. 9600959

[51] Int. Cl.[7] ........................................... G01V 1/02
[52] U.S. Cl. ............................. 367/23; 367/144; 367/4
[58] Field of Search .......................... 367/23, 144, 16; 340/10

[56] References Cited

U.S. PATENT DOCUMENTS

| | | | |
|---|---|---|---|
| H656 | 7/1989 | Huizer et al. | 367/23 |
| 4,956,822 | 9/1990 | Barber et al. | 367/23 |
| 5,018,115 | 5/1991 | Pascouet | 367/144 |
| 5,281,773 | 1/1994 | Duren | 181/111 |
| 5,319,609 | 6/1994 | Regnault | 367/16 |

FOREIGN PATENT DOCUMENTS

| | | | |
|---|---|---|---|
| 0538129 | 4/1993 | European Pat. Off. | |
| 0538129A1 | 4/1993 | France | 367/16 |
| 2126343 A | 8/1983 | United Kingdom | 214/23 |
| 21489001 A | 10/1983 | United Kingdom | 214/23 |
| 2126343 | 3/1984 | United Kingdom . | |
| 2148001 | 5/1985 | United Kingdom . | |

*Primary Examiner*—Christine K. Oda
*Assistant Examiner*—Victor J. Taylor
*Attorney, Agent, or Firm*—Jacobson, Price, Holman & Stern PLLC

[57] ABSTRACT

A method and apparatus for controlling the operation of a multiple-element marine seismic pulse generating source in rough sea surface conditions. The method first determines the shape of the path along which the elements are traveling at the point in time just before each element of the source is activated. Once the shape of the path is known, the relative vertical position of each element relative to a fixed reference is determined. Adjustments can then be entered into the firing times for each element such that the primary pressure peaks constructively interfere with one another. In a preferred embodiment, a plurality of inclinometers associated with the harness from which the devices are suspended provides a tilt angle measurement from which the shape of the path can be determined and the firing times adjusted accordingly.

8 Claims, 5 Drawing Sheets

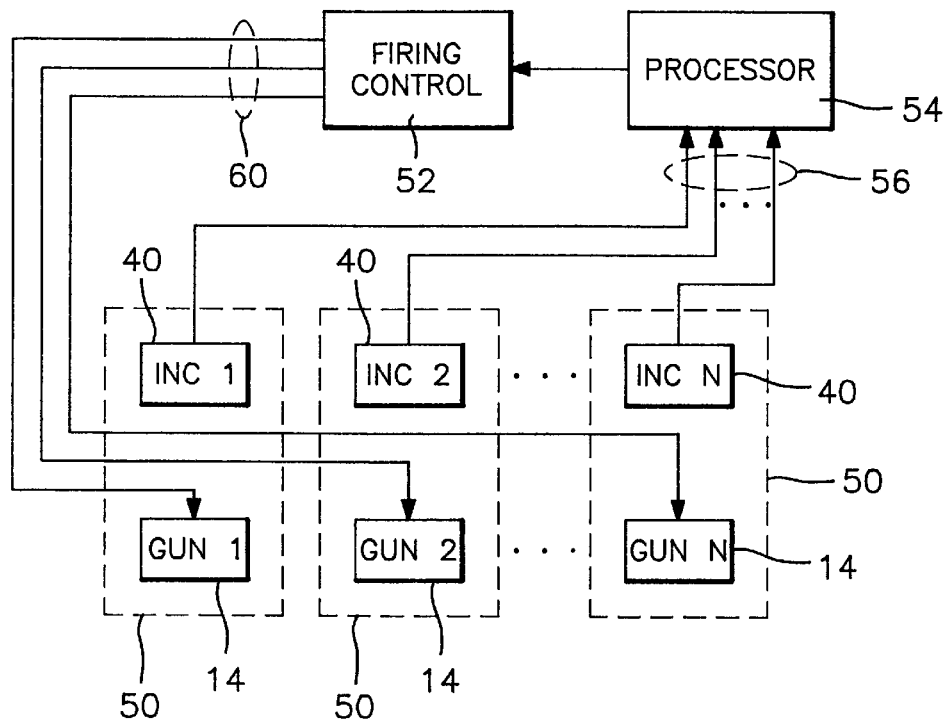
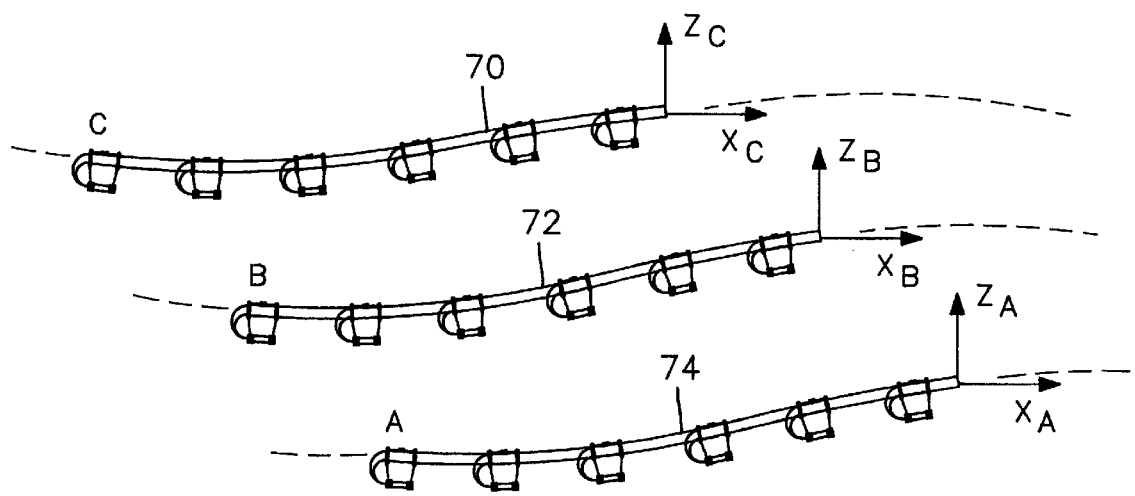

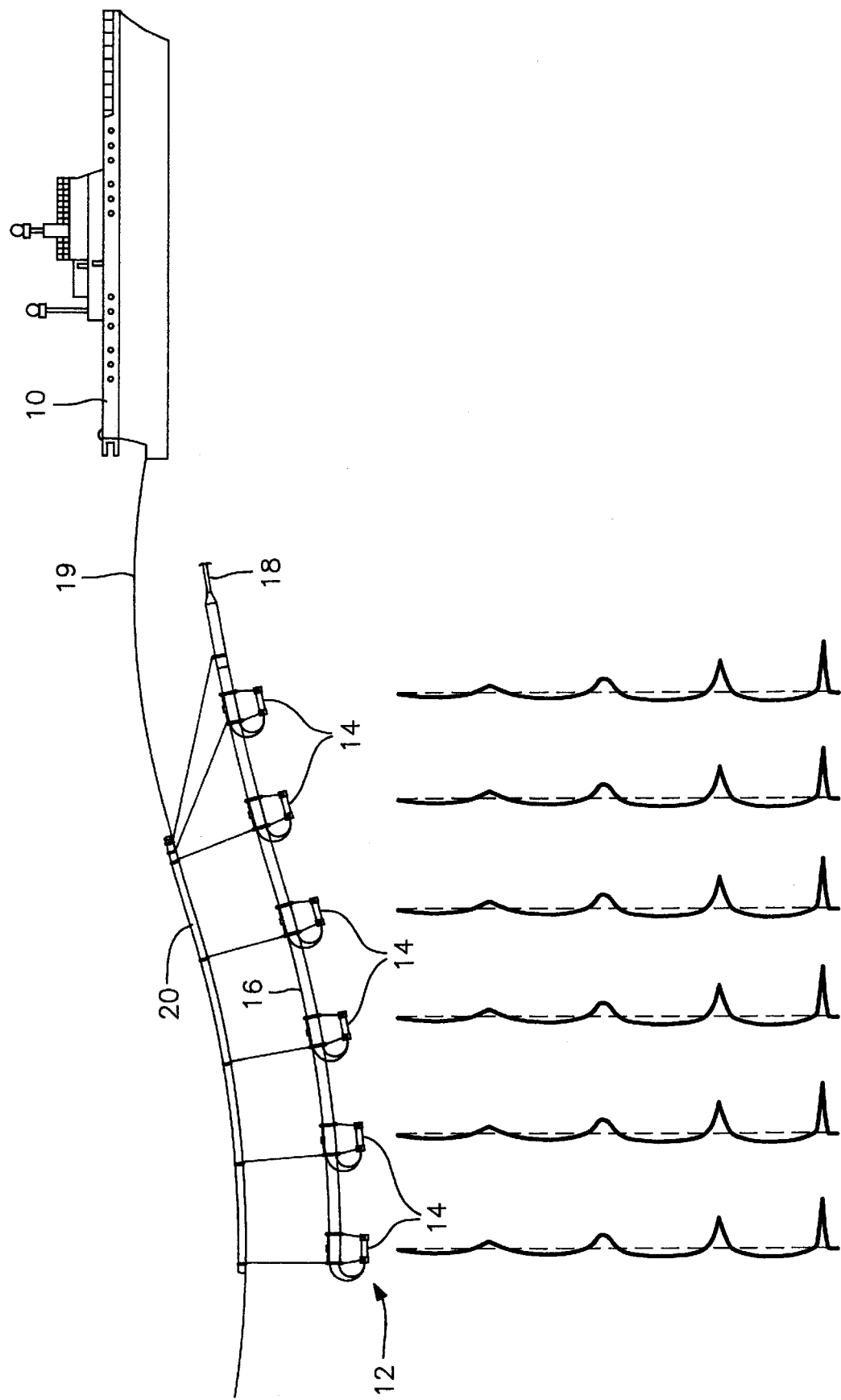

METHOD AND APPARATUS FOR REDUCING THE EFFECT OF ROUGH SEA SURFACE CONDITIONS ON MARINE SEISMIC SOURCES

TECHNICAL FIELD OF THE INVENTION

The present invention pertains in general to seismic exploration, and more particularly, to controlling a marine seismic signal source used for exploring the earth's strata located below a body of water.

BACKGROUND OF THE INVENTION

A known technique for distributing pulses of seismic energy to the earth's strata in marine seismic exploration is to use an array of chambered airguns attached to the aft of a boat. Such arrays typically consist of a number of sub-arrays having individual airguns and clusters of airguns rigidly mounted in frames. The boat tows this array to a predetermined position and then fires the chambered airguns at the same time. This technique is more fully described in U.S. Pat. No. , 4,956,822, which is incorporated herein by reference.

Each of the chambered airguns in the array is operable to generate a series of pulses of seismic energy that travel through the water and into the earth's strata. Each airgun produces a "signature" which provides a quantitative measurement of the airgun's output and performance. When an airgun is fired, an initial pulse is generated having a first, positive peak called the "direct" or "primary" arrival. The amplitude of this peak is called the peak amplitude, which corresponds to the increase in pressure that occurs in the water as the compressed air first explodes out of the airgun. The primary arrival is followed by a large negative peak that corresponds to a reflection from the waters surface and is called a "ghost".

The primary arrival and ghost are followed by a sequence of bubble pulses or oscillations which correspond to the pressure variations that occur in the water due to the expansion/compression cycles of the air bubbles.

One of the characteristics of the airgun's signature is the primary pulse-to-bubble ratio. This is a ratio of the primary peak-to-peak amplitude, divided by the peak-to-peak strength of the bubble pulses. This pulse-to-bubble ratio varies from airgun to airgun, and is used to characterize the various types of airguns. This ratio varies as a function of chamber volume, airgun depth and firing pressure. Another characteristic of an airgun signature is the bubble period. This is the time delay between the primary peak amplitude and the first bubble peak amplitude. The bubble period for an airgun depends on the chamber volume, airgun depth and firing pressure.

As previously mentioned, an airgun array typically includes a plurality of airguns either individually, as clusters, or a combination thereof. The primary purpose of such an arrangement is to increase the total output energy, and also allows the designer of the array to shape the far-field signature and the directivity pattern, or "tune" the array, such that the primary peaks add up or constructively interfere with one another, while the bubble oscillations cancel themselves out or destructively interfere with one another.

Generally speaking, airgun arrays are designed and used with the assumption that each element of the array will remain at a fixed vertical position relative to a fixed reference during a marine seismic operation, which is normally a valid assumption during calm sea conditions. However, when the array encounters rough sea conditions, the large waves can have a pronounced effect on the vertical position of each element of the array. In such a situation, the primary pulses from each element of the array are no longer synchronized, and the bubble pulses are not effectively suppressed. This, of course, defeats the primary purpose of constructing an array out of a plurality of individual elements. In very rough sea conditions, the array can become "de-tuned" to the point where the marine seismic operation has to be halted, which leads to down time and increased costs.

SUMMARY OF THE INVENTION

According to one aspect of the present invention, there is provided a seismic pulse generating apparatus comprising:
  a plurality of seismic pulse generating devices having a predetermined desired spatial relationship;
  a plurality of sensors disposed proximate to said seismic pulse generating devices to determine the tilt angles thereof;
  a processor for determining the shape of the path along which said seismic pulse generating devices are travelling from said determined tilt angles; and
  a control system for controlling the time said seismic pulse generating devices are activated to thereby generate a seismic pulse, said control system being operable to adjust the times at which said seismic pulse generating devices are activated as a function of the determined shape of said path so as to tend to compensate for changes in said desired spatial relationship.

According to another aspect of the invention, there is provided a method for generating seismic pulses, the method comprising the steps of:
  providing a plurality of seismic pulse generating devices having a predetermined desired spatial relationship;
  determining the tilt angles of the seismic pulse generating devices;
  determining the shape of the path along which said seismic pulse generating devices are travelling from the determined tilt angles; and
  controlling the times at which the seismic pulse generating devices are activated as a function of the determined shape of said path so as to tend to compensate for changes in said desired spatial relationship.

In a preferred embodiment of the present invention, the position determining device comprises a plurality of inclinometers disposed along a harness to which the seismic pulse generating devices are attached. The output signal from each inclinometer provides a tilt angle. This tilt angle is used in conjunction with the known distances between adjacent inclinometers to determine the instantaneous shape of the path along which the harness is travelling. Once the shape of the path is determined, the vertical displacement of each of the seismic pulse generating devices with respect to a fixed reference can also be determined. With this information, the control system adjusts the moment in time that each element of the array is fired, thereby keeping the array in a "tuned" condition despite the rough sea condition.

BRIEF DESCRIPTION OF THE DRAWINGS

For a more complete understanding of the present invention and the advantages thereof, reference is now made to the following description taken in conjunction with the accompanying drawings in which:

FIG. 4 illustrates a block diagram of the control system utilized in conjunction with the present invention;

FIG. 5 illustrates a diagrammatic view of the towed airgun array with the control system of the present invention;

FIG. 6 illustrates a diagrammatic view depicting a solution for multiple towed arrays;

DETAILED DESCRIPTION OF THE INVENTION

Figure 1:
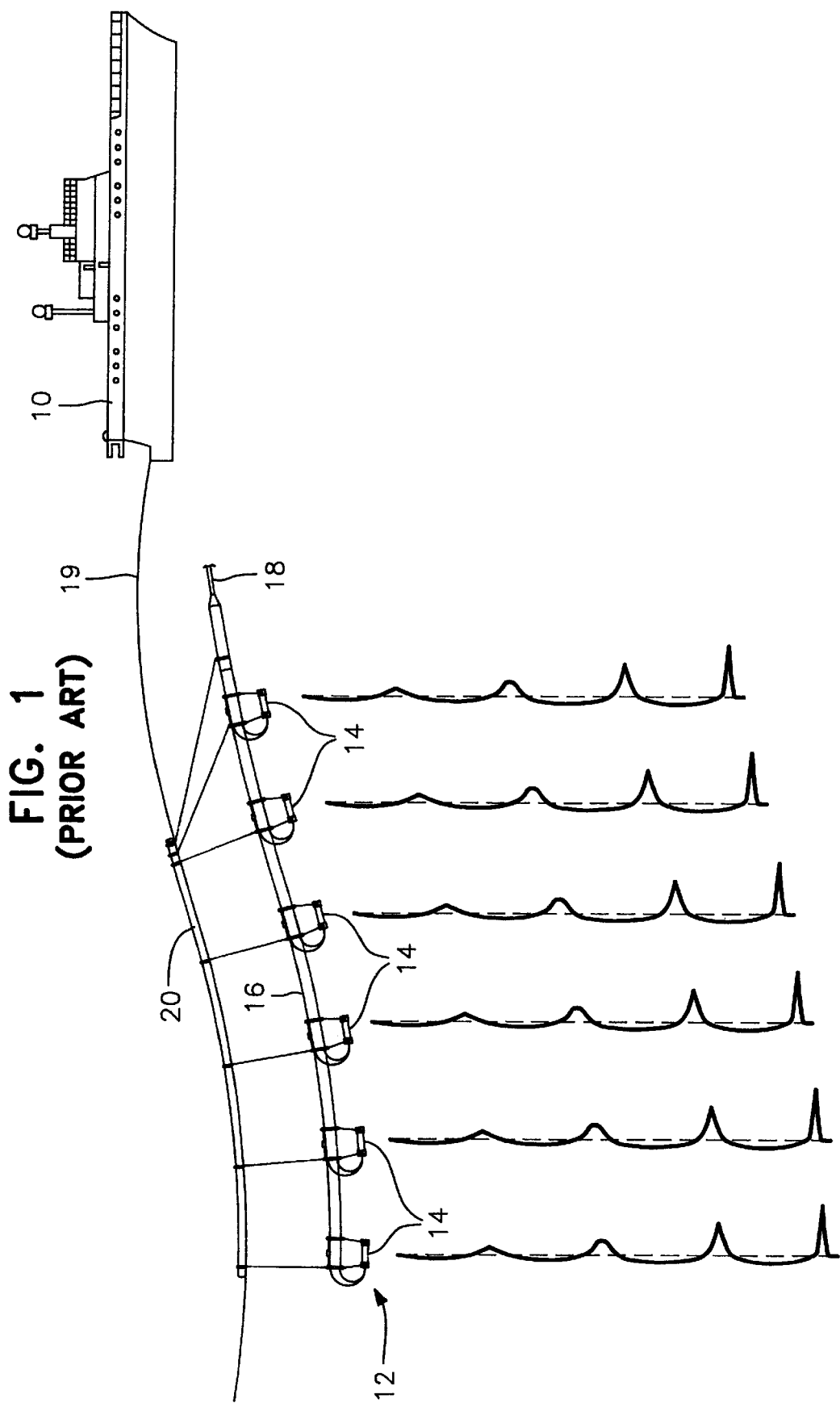
FIG. 1 illustrates a diagrammatic view of a towed airgun sub-array using a prior art control mechanism on rough seas.

With reference now to FIG. 1, there is illustrated a diagrammatic view of a prior art airgun seismic pulse generating system generally indicated as 12 being towed behind a seismic vessel 10. Array 12 includes a plurality of individual devices 14 which are typically individual airguns or clusters of airguns disposed along the length of a harness 16. Harness 16 is connected to an umbilical system 18 which is connected to the vessel 10. System 18 includes various electrical conductors for controlling the operation of the array, and also includes air conduits for supplying compressed air. Such as system is further described in U.S. Pat. No. 4,956,822, mentioned hereinbefore.

The harness 16 is typically disposed a certain distance below surface 19 of the ocean. This distance is maintained by suspending harness 16 from a float 20 which generally tends to follow the curvature of the ocean's surface 19. During calm seas, of course, surface 19 is relatively flat, However, during rough sea conditions, there can be a considerable amount of wave action of peaks and valleys, which causes float 20 and attached harness 16 to rise and fall accordingly.

FIG. 1 also shows the pressure versus time signature of each of the airguns 14 after they have been fired. It can be seen that the arrival time of the primary peaks of the signature in the far field is influenced by the shape of sea surface 19, which can result in mis-synchronization or "de-tuning". Current systems have great difficulty in correcting for these at differences in arrival time because any correction factors are static in nature and do not have the dynamics associated therewith to allow for operation in rough seas. Therefore, present systems introduce major errors associated with vertical displacement differences between individual airguns and sub-arrays.

Figure 2:
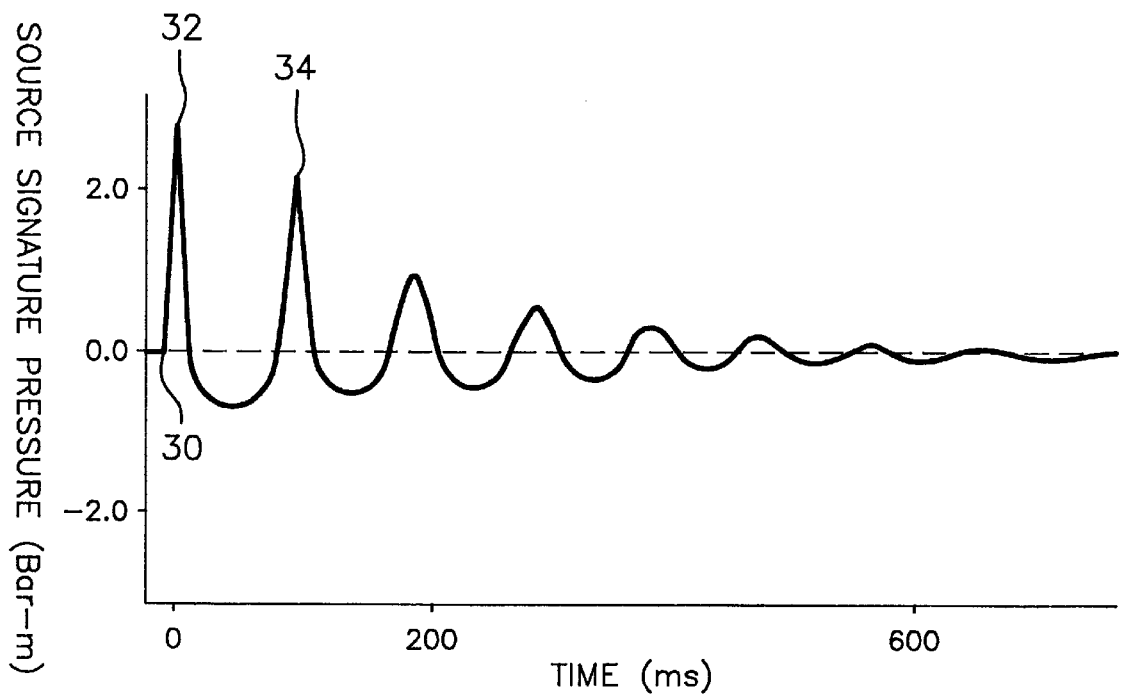
FIG. 2 illustrates the signature of a typical airgun.

With reference now to FIG. 2, there is illustrated a diagrammatic view of an exemplary near-field signature of a single airgun in the time domain, in this case a 195 cu.in. Bolt airgun fired at 6 meters below the ocean surface. The primary peak is indicated as 32 with the next peak being a residual bubble peak 34. The time between the peaks 32 and 34 is the bubble period. The following bubble peaks comprise a "ringing" signal caused by the oscillating air bubble that is released when the airgun 14 is fired. The primary objective of firing several airguns at the same time is to add up and increase the primary bubble peak 32 part of the total signal by constructive interference, and to suppress the following bubble ringing by destructive interference.

Figure 3:
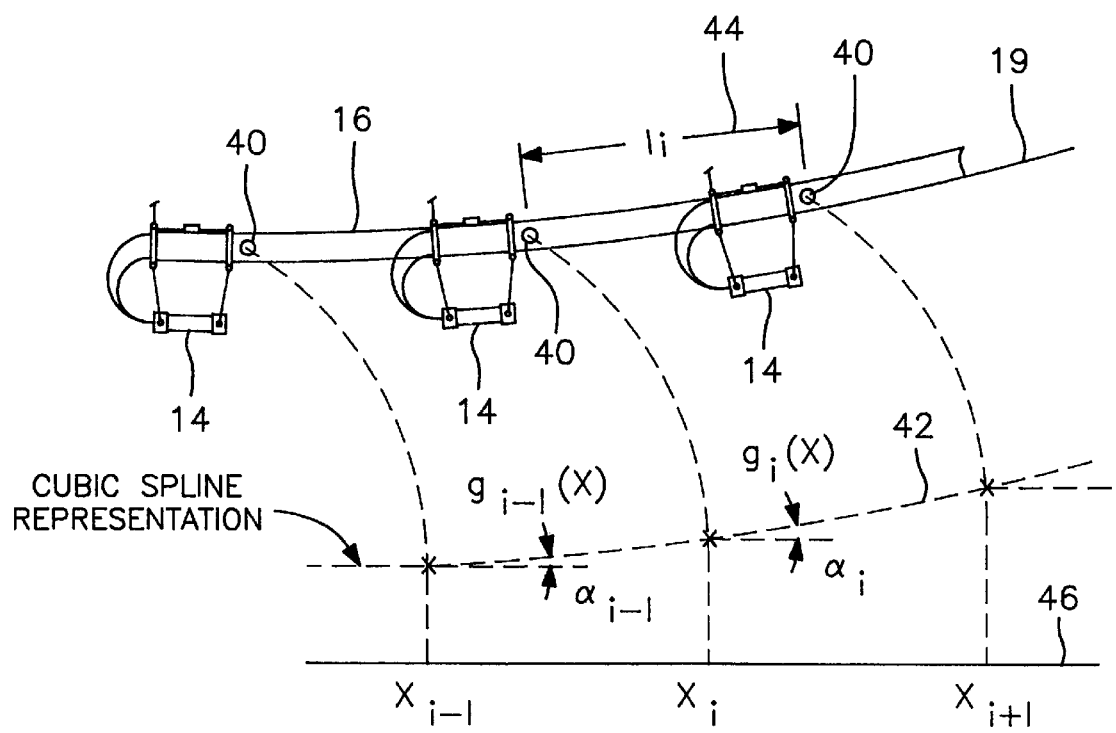
FIG. 3 illustrates a diagrammatic view of the method for calculating the inclination angle of individual elements in a given sub-array.

With reference now to FIG. 3, there is illustrated a detailed view of the basic concept of the present invention. In FIG. 3, harness 16 is shown as following an arcuate path caused by rough sea surface 19. Harness 16 is provided with a plurality of inclinometers 40 such as those available from Lucas Schaevitz, type Accustar. The output signal from each of the inclinometers 40 is directly related to the degree to which inclinometer 40 is tilted with respect to a horizontal plane. From this "tilt angled", the slope of harness 16 can be determined and from this the shape of the path that harness 16 is traveling can be determined in the following exemplary manner.

For the purpose of discussions, the path that harness 16 travels through the water is represented by a spline 42. The equation for the curve associated with spline 42 is g(x). Let N be the number of inclinometers 40 mounted on the harness 16 and $a_i$ the tilt angle for the $i^{th}$ inclinometer, where i=0, 1, . . . , N-1. Let $l_i$ where i=0,1, . . . , N-2 denote the observed section length 44 between inclinometer i and i+1, and let $x_i$ where i=0, 1, . . . , N-1 denote the horizontal in-line position of the inclinometers.

The spline represented by dotted line 42 passes through a given set of points. If the function for this spline is g(x), then under certain assumptions, g(x) can be described as being built up of a set of third-degree polynomials $g_i(x)$, i=0, 1, . . . , N-1 in such a way that g(x) and its two derivatives are everywhere continuous. Such a function is called a cubic spline function.

The third-degree polynomial representing the cubic spline function between inclinometer i and i+1 can be written as:

$$g_i(x)=a_i+b_i(x-x_i)+c_i(x-x_i)^3+d_i(x-x_i)^3$$

where the coefficients $a_i$, $b_i$, $c_i$ and $d_i$ are unknown.

The cubic spline function g(x), for $x_0 \leq x \leq x_{N-1}$, has the following properties:

(1) The derivative of the spline equals the measured slopes: $g'(X_i)=\alpha_i$, i=0, 1, . . . N-1;

(2) g(x), g'(x) and g"(x) are continuous;

(3) $g(x)=g_i(x)$ in each interval $x_i \leq x \leq x_{1-1}$, i=0, 1, . . . N-2; and (4) If h(x) is any other function satisfying the first three properties, then;

$$\int_{x_0}^{x_{N-1}} [g''(x)]^2 dx \leq \int_{x_0}^{x_{N-1}} [h''(x)]^2 dx$$

It can be shown that the last property is satisfied provided that $g''(x_0)=g''(x_{N-1})=0$.

Since the polynomial g(x) is cubic, g"(x) is linear in the interval $x_i \leq x \leq x_{i+1}$. Hence, if the function g"(x) for i=2,3, . . . , N-2 can be determined, then g' (x) and g(x) can be determined anywhere by straightforward integration of g"(x).

By introducing the notations:

$$g_i'' = g''(x_i), \quad i = 0, 1, \ldots, N-1$$

$$s[i+1, i] = \frac{(\alpha_{i+1} - \alpha_i)}{(x_{i-1} - x_i)}, \quad i = 0, 1, \ldots, N-3$$

it can be shown that solving the curvature $g_i''$ reduces to the problem of solving the system of linear equations:

$$Ag=s$$

where:

$$A = \begin{vmatrix} 1 & 0 & 0 & \cdots & 0 \\ 1 & 1 & 0 & & 0 \\ 0 & 1 & 1 & & 0 \\ \cdots & & & & \\ 0 & \cdots & 0 & 1 & 1 \end{vmatrix},$$

$$g = \begin{vmatrix} g_1'' \\ g_2'' \\ \cdots \\ g_{N-2}'' \end{vmatrix}, \text{ and } s = 2 \begin{vmatrix} s[1, 0] \\ s[2, 1] \\ \cdots \\ s[N-2, N-3] \end{vmatrix}$$

The system of linear equations can be solved directly by multiplying the fixed inverse A matrix with the s vector.

When a theoretical representation of the sub-array shape is determined, then the vertical depth offsets at the airgun positions are used to find the relative fire times of the individual airguns. Let M be the number of sub-array airguns and $x_j$, j=0, 1, . . . , M-1 the horizontal positions. The fire time adjustment $\tau_j$ of the jth airgun can then be computed as follows:

$$\tau_j = \frac{g(x_j)}{c}$$

where c is the speed of sound in the water.

With reference now to FIG. 4 in conjunction with FIG. 1, there is illustrated a diagrammatic view of the overall control system for controlling the operation of the seismic pulse generating array. The control system includes a firing control system 52 that controls the time that each airgun 14 is fired. Processor 54 is operable to receive the output signals of each of the inclinometers 40 associated with harness 16 to which the individual elements of the array are suspended. These signals are received via signal lines 56 cried with umbilical system 18. The signals from each inclinometer 40 are fed to the processor 54 which then uses this information to compute the relative vertical displacement of the airguns from a fixed reference and the advance or delay $\tau_j$ to apply to each airgun as previously explained. This is then relayed to the airguns from the firing control system 52 via the control lines 60.

The computed fire time adjustment that correspond to the differences in the vertical position of the individual elements of the array just before they are activated are submitted as shot-to-shot varying fire offsets to the firing control system 52. If an airgun is physically located above the fixed reference, then a positive fire compensation delay is applied. This delay is added as a negative offset to the fire time given by the source controller in such a way that the airgun is activated earlier than in conventional use. Conversely, if an airgun is physically located below the fixed reference, then a negative fire compensation delay is applied.

With reference now to FIG. 5, there is illustrated a diagrammatic view illustrating the near-field responses of each of the airguns 14 after firing time adjustments have been made using the present invention. It can be seen that the primary peaks from each airgun 14 are aligned despite the rough sea surface 19 as would be the case in a calm sea condition.

With reference now to FIG. 6, there is illustrated multiple sub-arrays 70, 72 and 74 are shown, each having its own harness 16, umbilical system 18, float 20 and plurality of airguns or clusters of airguns. In rough sea conditions, each sub-array 70,72, 74 may ride the surface waves at different phases. This means that the vertical position of each of the sub-arrays 70–74 with respect to a fixed reference could be different. The variation in the coordinate of each array must therefore be known before the information about the vertical position offsets can be used in adjusting the airgun firing times.

Figure 7:
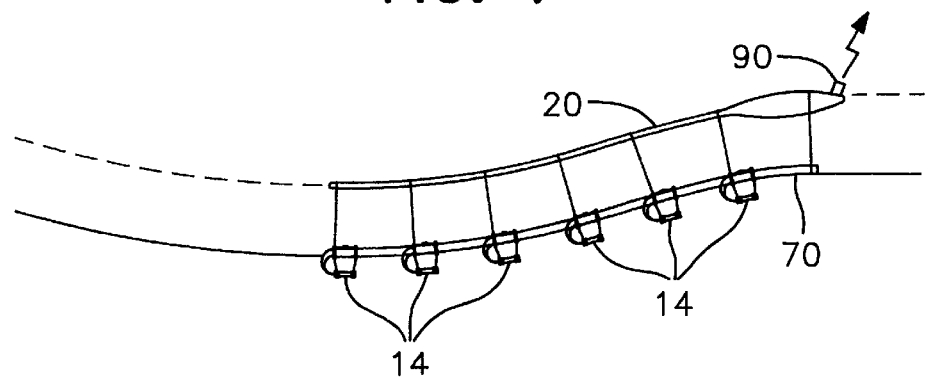
FIG. 7 illustrates a diagrammatic view utilizing a GPS receiver approach.

With reference now to FIG. 7, there is illustrated sub-array 70 having a global positioning satellite (GPS) receiver 90 associated with float 20. By assuming a constant depth offset between the front position of each of the subways 70–74 and its associated float 20, the variation in z-position between the sub-arrays 70–74 can be measured using the GPS receivers 90.

Figure 8:
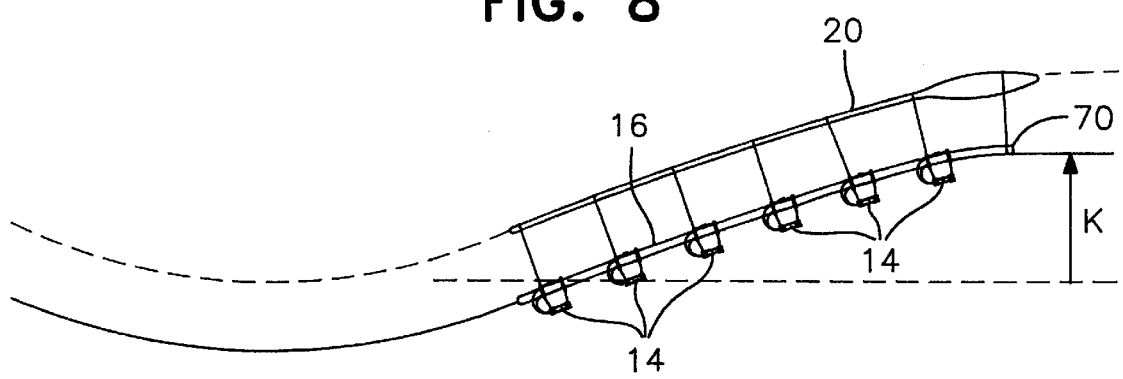
FIG. 8 illustrates a diagrammatic view for utilizing a Least Mean Squares (LMS) technique.

With reference now to FIG. 8, there is illustrated a diagrammatic view of the sub-array 70 wherein a least mean squares (LMS) approach is used. In weather conditions where a cyclic movement of the sub-array occurs, a sine wave representation to approximate the long-period sub-array shape can be used to find the absolute z-positions of the airguns 14 to sufficient accuracy. If the relative sub-array shape is sampled sufficiently close enough to achieve shape correlation with time, a sine function description relative to an equilibrium level, which must be the same for all sub arrays, can be made. If g(x) is the cubic spline representation of a vertical sub-array shape computed from tilt measurements, by assuming cyclic movements of the sub-array 70 with time, g(x) can be approximated by the sine curve:

$$S(x) = Z_0 + K \cos(kx + \phi)$$

where the vertical offset $Z_0$, the amplitude K, the wave number k and the phase $\phi$ are unknown.

The LMS technique can be used to estimate the four parameters $Z_0$, K, k and $\phi$ that give the best function fit in a squared error sense. The offset parameter $Z_0$ is then the vertical position offset of g(x) from the fixed reference.

Once the relative offsets of each of the sub-arrays are calculated and the shape of the path that each of the sub-arrays is traveling is determined from the incinometers 40 associated with the harnesses 16 of each of the sub-ways 70–74, it is then possible to offset each of the sub-arrays relative to each other, such that the primary peaks from each of the elements of the sub-arrays constructively interfere with one another.

In summary, the present invention provides a method of and apparatus for reducing the effect of rough sea conditions on a marine seismic pulse generating source. The method involves first determining the shape of the path over which the airgun array is towed at the point in time just before the airguns are to be fired. Once the path shape is known, the vertical position of each element of the array with respect to a fixed reference can be determined. Delays or advances are then introduced into the firing signals sent to each element of the array. In a preferred embodiment, the path shape is determined by measuring a tilt angle with a series of inclinometers associated with the harness carrying the airguns.

Although the preferred embodiment has been described in detail, it should be understood that various changes, substitutions and alterations can be made therein without departing from the spirit and scope of the invention as defined by the appended claims. For example, each of the inclinometers 40 can be replaced by one or more accelerometers, whose outputs are processed (eg integrated) to provide signals analogous to those provided by the inclinometers. Alternatively, the inclinometers 40 can be used in conjunction with accelerometers, in order to better characterise the shape of the path followed by the airgun array.

We claim:

1. A seismic pulse generating apparatus comprising:

a plurality of seismic pulse generating devices having a predetermined desired spatial relationship;

a plurality of sensors disposed proximate to said seismic pulse generating devices to determine the tilt angles thereof;

a processor for determining the shape of the path along which said seismic pulse generating devices are travelling from said determined tilt angles; and a control system for controlling the time said seismic pulse generating devices are activated to thereby generate a seismic pulse, said control system being operable to adjust the times at which said seismic pulse generating devices are activated as a function of the determined shape of said path so as to compensate for changes in said desired spatial relationship.

2. The apparatus of claim 1, wherein said control system is operable to adjust the time each of said seismic pulse generating devices is activated such that the primary pulses generated by said seismic pulse generating devices constructively interfere with one another.

3. The apparatus of claim 1 wherein said plurality of seismic pulse generating devices are disposed in an array consisting of one or more sub-arrays.

4. The apparatus of claim 1 wherein said seismic pulse generating devices are airguns, clusters of airguns, or combinations thereof.

5. A method for generating seismic pulses, the method comprising the steps of:

providing a plurality of seismic pulse generating devices having a predetermined desired spatial relationship;

determining the tilt angles of the seismic pulse generating devices;

determining the shape of the path along which said seismic pulse generating devices are travelling from the determined tilt angles; and controlling the times at which the seismic pulse generating devices are activated as a function of the determined shape of said path so as to compensate for changes in said desired spatial relationship.

6. The method of claim 5, wherein the step of controlling includes the step of adjusting the time each of the seismic pulse generating devices is activated such that the primary pulses generated by the seismic pulse generating devices constructively interfere with one another.

7. The method of claim 5 wherein said plurality of seismic pulse generating devices is disposed in an array consisting of one or more sub-arrays.

8. The method of claim 5 wherein said seismic pulse generating devices are airguns, clusters of airguns, or combinations thereof.

* * * * *